Figure 1:
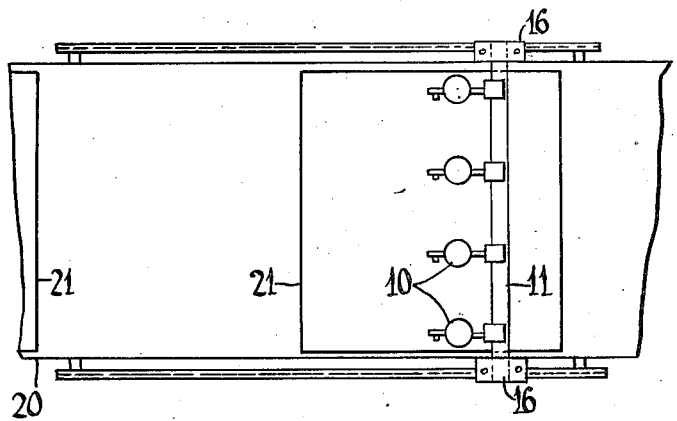

Oct. 24, 1944. A. C. OAKES 2,361,049
GLASS CUTTER
Filed Oct. 1, 1942 2 Sheets-Sheet 1

Inventor
ALFRED C. OAKES

By Olen E. Bee
Attorney

Oct. 24, 1944.   A. C. OAKES   2,361,049
GLASS CUTTER
Filed Oct. 1, 1942   2 Sheets-Sheet 2

Inventor
ALFRED C. OAKES
By Olen E. Bee
Attorney

Patented Oct. 24, 1944

2,361,049

UNITED STATES PATENT OFFICE 2,361,049

GLASS CUTTER

Alfred C. Oakes, Mount Vernon, Ohio, assignor to Pittsburgh Plate Glass Company, Allegheny County, Pa., a corporation of Pennsylvania Application October 1, 1942, Serial No. 460,363

4 Claims. (Cl. 33—32)

This invention relates to glass cutting apparatus and it has particular relation to automatic cutters designed to be employed individually or in groups to cut sheet glass passing beneath them.

One object of the invention is to provide an improved glass cutting mechanism designed to operate automatically.

Another object of the invention is to provide improved hydrostatic glass cutters particularly adaptable for use in cutting glass sheets as the latter pass upon conveyors beneath the cutters, or as the cutters pass across the glass.

In cutting glass sheets, such as window glass, which is drawn and has certain degrees of undulations in its surface, difficulty has been experienced in securing a uniform cut or score especially where the glass is carried by a conveyor at relatively high speeds. Known types of cutters have a tendency to skip and bounce on the glass, and in subsequently severing the glass along the cut, the break may not be clean, or in many instances will not follow the line of scoring. It is proposed to overcome these disadvantages by employing a cutter which is operated under a pressure of a column of liquid acting upon a diaphragm, the latter of which is connected to a cutter. The weight of the liquid determines the pressure of the cutter upon the work and is effective in damping vibrations and in preventing skipping of the cutter upon the glass. Automtic fluid pressure controlling devices are included in the apparatus to raise and lower the cutter in connection with its operation.

Figure 4:
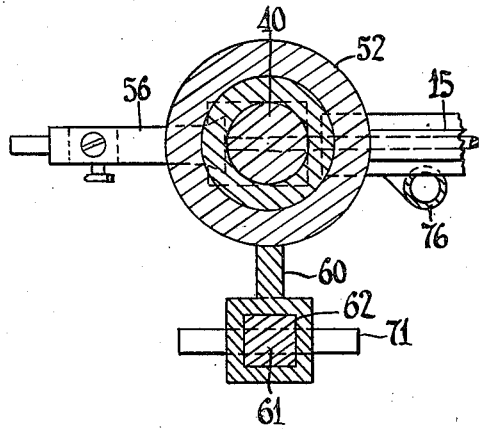
Figure 5:
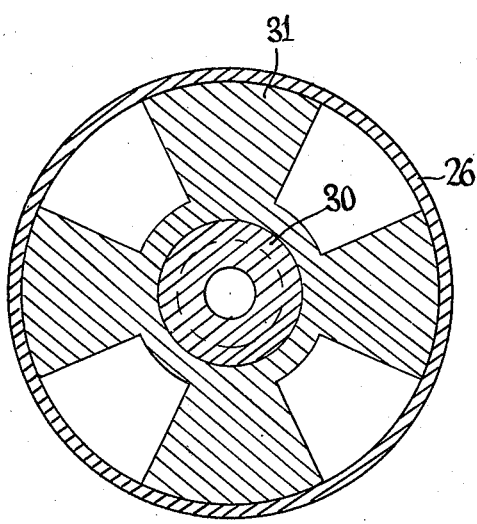
Figure 3:
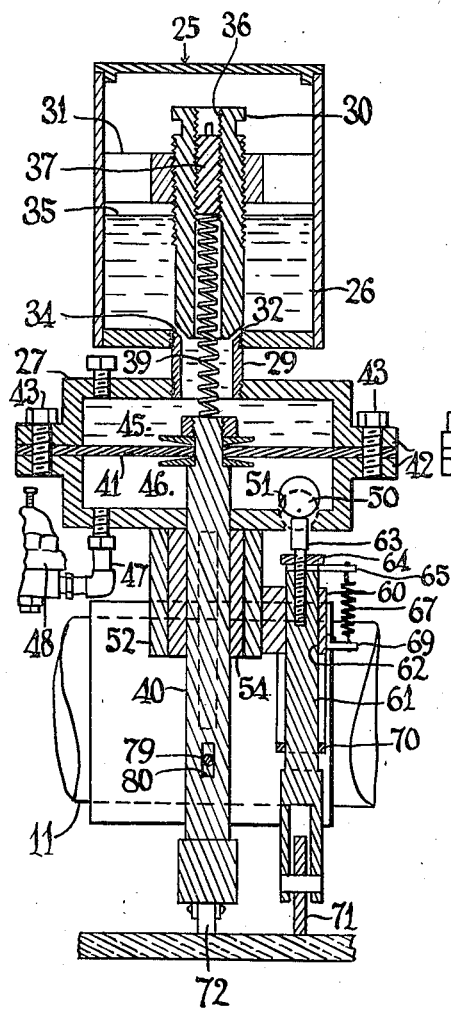
Figure 2:
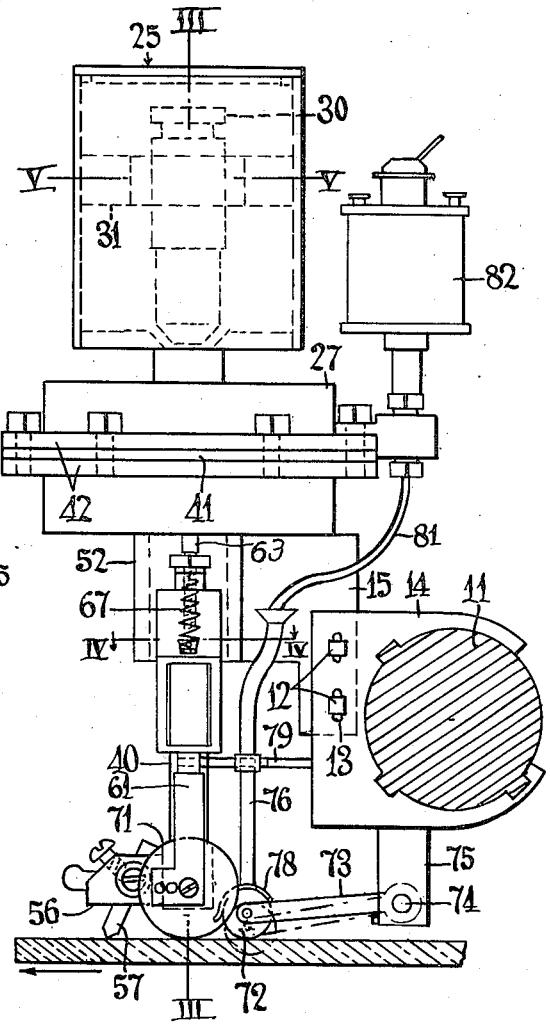

In the drawings:

Fig. 1 is a fragmentary diagrammatic plan of a conveyor and cutting devices operable in connection therewith; Fig. 2 is a side elevation, on a larger scale, of a cutter and operating mechanism therefor, portions of the supports and glass being shown in cross section; Fig. 3 is a vertical section taken substantially along the line III—III of Fig. 2; Fig. 4 is a fragmentary horizontal section, on a larger scale, taken substantially along the line IV—IV of Fig. 2; and Fig. 5 is a horizontal section, on a larger scale, taken substantially along the line V—V of Fig. 2.

In practicing the invention, cutter units 10 are mounted upon a horizontal support 11 by means of bolts 12 extending through slots 13 to secure mounting members 14 and 15 rigidly together and to provide a cutter supporting assembly. A member 15 is directly connected to each cutter unit. The slots 13 are formed in the element 14 to provide for vertical adjustment of the units in placing them in postion to be operated. Frame members 16 designed to carry a driven conveyor 20 are rigidly connected to the horizontal support above the conveyor. Sheet glass 21 to be scored or cut is carried upon the conveyor and is movable horizontally beneath the cutter units.

Each cutter unit comprises a container 25 including upper and lower chambered casings 26 and 27 which communicate with each other through a nipple 29 rigidly connecting them. A vertically adjustable needle valve 30 is threaded centrally through a spider 31 that is rigidly secured inside, and horizontally across, an intermediate portion of the upper casing 26 and its lower seating end 32 cooperates with a beveled seat 34 formed in the upper end of the nipple to determine the passage therethrough of liquid 35 in the container. This liquid can be in the form of oil, glycerine, mercury, or like material. The body of the needle valve 30 has an internally threaded bore 36 in the upper end of which a plug 37 is threaded and in which a compression spring 39 is disposed in such position that its lower end projects downwardly through the nipple into the lower casing 27. The upper end of a spring is supported against the lower end of the plug 37 and the lower end of the spring rests against the upper end of a cutter stem 40 which is secured in fluid-tight relation to the central portion of a diaphragm 41 composed of flexible metal, rubber, fabric, leather, or such material as will be both flexible and impervious to liquid. The lower chamber 27 is sectional and has horizontal flanges 42 between which the outer edge of the diaphragm is clamped by means of bolts 43. The lower casing 27 is thus divided into an upper liquid-containing chamber 45 and a lower fluid compression chamber 46. The latter has a conduit 47 in which an air pressure regulator 48 is installed in connection with a conventional source of air under pressure (not shown). The conduit is mounted in communication with the chamber 46 according to well known methods.

A ball valve 50 rests in a spherical seat 51 in the lower horizontal wall of the casing 27. This seat defines an opening providing communication between the chamber 46 and the outside atmosphere.

The lower portion of the unit has welded or otherwise rigidly secured thereon a vertical sleeve 52 including a bushing 54 mounted therein in which the cutter stem 40 is vertically slidable in substantially airtight relation. A cutter head 56 is mounted in the lower end of the stem and a cutter 57 carried thereby is adapted to engage the glass for scoring the latter.

A bracket 60 is welded upon one side of the sleeve 52 and receives a vertically slidable actuator 61 in the form of a bar which is disposed in a vertical opening 62 in the bracket 60. A pin 63 is threaded vertically into the upper end of the bar 61 and registers with the ball valve 50 to actuate the latter. A nut 64 threaded upon the pin clamps an arm 65 between it and the upper end of the bar 61 to support a tension spring 67. Opposite ends of the spring are connected to the arm 65 and to a second arm 69 that is welded or otherwise rigidly secured to the bracket 60. A stirrup 70 secured to the lower portion of the bracket receives an intermediate portion of the bar 61 slidably therethrough to prevent it from tilting. A roller 71 is carried upon the lower end of the bar to be engaged by sheet glass carried thereunder by the conveyor.

In order to facilitate the operation of the cutter 57, a felt roller 72 is rotatably carried upon the outer end of an arm 73 that is secured by means of a pivotal connection 74 to a bracket 75 on the supporting element 14. This felt roller is disposed immediately below a tube 76 that has a resilient perforated shoe 78 secured upon its lower end and is supported intermediate its ends upon an arm 79 that is rigidly supported upon the element 14 and extends laterally therefrom beyond the tube and into a slot 80 formed in the cutter stem 40. The arm 79 thus prevents rotation of the stem about its axis, but permits vertical movement thereof. The felt roller when in its raised position shown in full lines in Fig. 2 engages the shoe 78. The upper end of the tube 76 is funnel shaped and receives a second tube 81 connected to a lubricant supplying cup 82 that is mounted upon the lower section of the cutter unit.

Sheet glass is conveyed in the direction of the arrow (Fig. 2) and its leading edge strikes the felt roller 72 to raise the latter to the full line position (Fig. 2) against the shoe 78 in order to insure a wiping action upon the glass. The leading edge of the glass then strikes the roller 71 and raises it until the upper end of the bolt 63 actuates the ball valve 50 to relieve the air pressure in the chamber 46. The weight of the liquid 35 in the unit above the diaphragm 41 presses the cutter downwardly into contact with the glass immediately after its leading edge has passed underneath the cutter. The needle valve 30 can be regulated to insure proper lag between the instant the valve 50 is opened and the leading edge of the glass passes underneath the cutter. When the roller 71 assisted by the spring 67 drops from the trailing edge of the glass, the ball valve 50 is again closed, the air pressure in the chamber 46 is increased and immediately raises the cutter to its inoperative position preparatory to receiving thereunderneath the next sheet of glass to be cut.

Although only one form of the invention has been shown and described in detail, it will be apparent to those skilled in the art that the invention is not so limited, but that various changes can be made therein without departing from the spirit of the invention or from the scope of the appended claims.

I claim:

1. In a glass cutting apparatus, a container having a column of liquid therein, a movable cutter stem having a cutter therein for engaging sheet glass, means for transmitting the weight of the fluid column to the cutter stem, and means for raising the cutter stem against the weight of the liquid.

2. In a glass cutting apparatus, a container including a pair of chambers having liquid therein, said chambers having a passage providing communication between them and said passage being below the level of the liquid, an adjustable valve for regulating the flow of liquid through said passage, a cutter stem extending into one chamber in fluid-tight relation and being responsive to pressure of said liquid to move into cutting position, and means for controlling movement of the stem against pressure of the liquid.

3. A glass cutter comprising a container having a column of liquid therein, a diaphragm in the container supporting the liquid, a cutter stem connected to the diaphragm and having a cutter adapted to move into contact with a glass sheet under pressure of the liquid, said container including an air chamber on the side of the diaphragm opposite the liquid, means for supplying air under predetermined pressure to the chamber to operate the diaphragm, and means for opening and closing the chamber to the atmosphere.

4. In a glass cutting mechanism adapted to score sheet glass movably supported beneath it, a container having liquid therein, a diaphragm in the container supporting the liquid and operable in response to the weight thereof, said container having an air chamber on the side of the diaphragm opposite the liquid, a pressure regulator communicating with the air chamber for building up sufficient pneumatic pressure on the diaphragm to overbalance the pressure of the liquid thereon, a valve in said chamber communicating with the atmosphere, and a valve actuator responsive to movement into contact therewith of the movable sheet glass to actuate the valve and relieve pressure in said chamber, and a cutter connected to said diaphragm and responsive to movement of the latter to contact the glass in cutting position.

ALFRED C. OAKES.